United States Patent
Bull

(10) Patent No.: US 6,273,641 B1
(45) Date of Patent: Aug. 14, 2001

(54) PROTECTIVE DEVICE

(75) Inventor: Anders Henrik Bull, Asker (NO)

(73) Assignee: ABB Off-Shore Technology AS, Nesbru (NO)

( * ) Notice: Subject to any disclaimer, the term of this patent is extended or adjusted under 35 U.S.C. 154(b) by 0 days.

(21) Appl. No.: 09/331,028

(22) PCT Filed: Dec. 11, 1997

(86) PCT No.: PCT/NO97/00333

§ 371 Date: Aug. 18, 1999

§ 102(e) Date: Aug. 18, 1999

(87) PCT Pub. No.: WO98/29611

PCT Pub. Date: Jul. 9, 1998

(30) Foreign Application Priority Data

Dec. 16, 1996 (NO) ........................................ 965404

(51) Int. Cl.[7] ............................................... F16L 1/12
(52) U.S. Cl. ...................... 405/157; 405/172; 405/46; 405/49
(58) Field of Search .................. 405/15, 16, 17, 405/19, 154, 157, 158, 159, 172, 49, 46

(56) References Cited

U.S. PATENT DOCUMENTS

| | | | |
|---|---|---|---|
| 980,442 | * 1/1911 | Schlafly | 405/49 |
| 3,495,410 | * 2/1970 | Bailey et al. | 405/49 |
| 4,171,174 | * 10/1979 | Larsen | 405/157 |
| 4,242,010 | * 12/1980 | Gjerde et al. | 405/157 |
| 4,329,084 | * 5/1982 | Chapa | 405/157 |
| 4,523,613 | * 6/1985 | Fouss et al. | 405/49 |
| 4,563,107 | * 1/1986 | Peterson | 405/157 |
| 4,605,338 | * 8/1986 | Peterson | 405/157 |
| 5,052,859 | * 10/1991 | Miller | 405/157 |
| 5,160,218 | * 11/1992 | Hill | 405/172 |
| 5,385,430 | * 1/1995 | Connonrs | 405/172 |
| 5,556,231 | * 9/1996 | Sidaway et al. | 405/49 |

* cited by examiner

Primary Examiner—David Bagnell
Assistant Examiner—Frederick L. Lagman
(74) Attorney, Agent, or Firm—Cohen, Pontani, Lieberman & Pavane

(57) ABSTRACT

A protective device having a shell structure and being shaped from a plate-shaped material, in particular but not exclusively, adapted for covering of a sub sea structure, such as at least one pipe line (21, 22), a Christmas tree or parts of such constructions. The protective device is designed as a downward open and upwards closed convex container or channel, comprising a substantially plane roof plate (5), e.g., two substantially plane and inclined side walls (3, 4) which may end in an individual foot plate (1, 2). The protective device or parts thereof is (are) designed with a shallow wave structure or with a weakly corrugated structure, the waves having a wave length (1) above 2.5 times the wave-height (h), and where the wave height does not exceed 10 times the thickness (d) of the plate-shaped material. As examples of usages the following may be mentioned: protection of constructions on land, lining of tunnels, building materials and modules for offshore living quarters.

12 Claims, 1 Drawing Sheet

Figure 2:
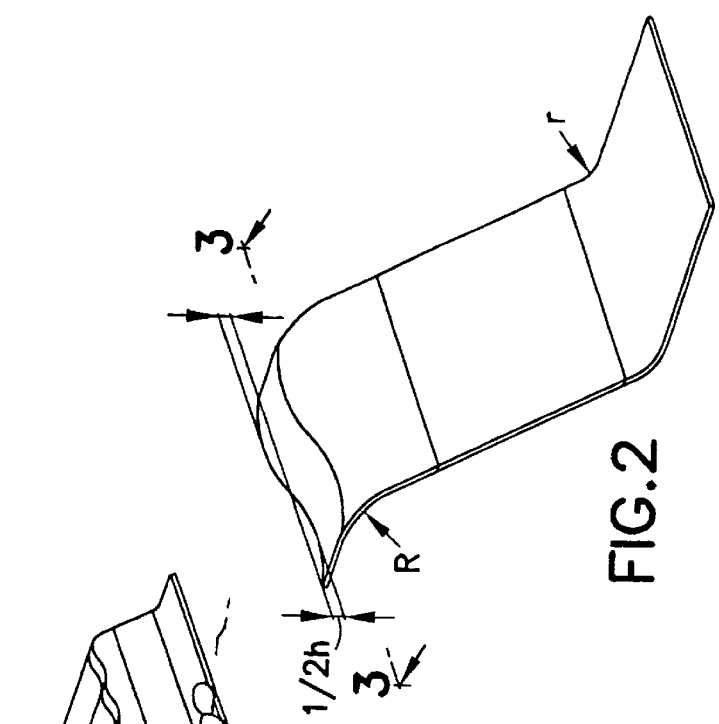

U.S. Patent  Aug. 14, 2001  US 6,273,641 B1

PROTECTIVE DEVICE

The present invention relates to a protective device made from a plate-shaped material, and relates in particular to a shell-shaped device adapted to cover a sub sea construction or parts of such a construction on the sea bed, which protective device is shaped as a downwards open and upwards closed convex shell, comprising a substantially plane roof plate with at least one mainly flat and preferably oblique directed side wall, which preferably ends in a transverse foot plate.

The device has extremely good mechanical qualities and low-weight and may accordingly be used for many different applications, such as tunnel linings, modules for buildings or building elements.

Previously there are known different protective devices adapted for covering of structures and equipment on the sea bed, to protect such structures against damages caused by over trawling, anchoring or other mechanical strain situations from ships and similar activities in the ocean, above the sub sea structures.

As examples of such protective devices it may be referred to Norwegian Patent No. 139.790 describing a device for protection of structures on the sea bed, where the protective device is a reinforced concrete element comprising two interconnected reinforcement nets. Further it is referred to Norwegian Patent No. 144.834 in which a similar protective device is built up as a covering, among other comprising flexible interconnected concrete elements, linked together both crosswise and lengthwise, and also UK-patent application No. GB 2178127A, which relates to a method for manufacturing of a protective mat for a flexible pipe, and where the mat elements are provided with pairs of holes designed to receive interlinking ropes or similar elements.

The above-mentioned solutions are all encumbered with different disadvantages, e.g. they are very heavy and compact, and accordingly large and also expensive vessels are required to produce/deploy/mount the earlier known protective devices, and the vessels also have to undertake many journeys before a long pipeline has been covered, causing large costs and risks during laying.

It is also previously known to make protective covers for sub sea use from plastics, and then in particular laminated, multi layer materials. The advantages are a low weight and less expensive materials, but these solutions have also led to problems, in particular as the material must be relatively thick to obtain sufficient stiffness and pressure resistance, but all the same large protective constructions built up of laminated artificial compositions, will easily be twisted so that the structures are unstable both during manufacturing, transportation and also during deployment on the site.

The object of the present invention is to provide a protective device in particular adapted for covering of a sub sea construction, such as a pipeline, a Christmas tree etc. in a much less expensive way and at least just as efficient as earlier solutions. Further it is an object of the present invention to provide a stable protective device which is not expensive, which is corrosion and pressure resistant, has a low weight causing that many or very large protective devices may be transported by a ship, which devices all the same are more stable than previously known lightweight constructions of similar design.

The object is also to provide a protective device for many applications both on land and in marine environments, which device is many cases may be used as a separate element and in other connections may be used as a module together with cooperating and similar, but not necessarily identical modules.

These objects are met by a protective device according to the below claims. The idea may primarily be said to stiffen the protective device as parts of it or the complete device is given a shallow wave form or a weakly corrugated shape which results in a rigid design without a corresponding weakening on the element.

It should be mentioned that corrugations also earlier have been used for different protective devices, but then as deep corrugations causing a very stiff material, e.g. in radial direction for corrugated tubes, but at the same time with increased flexibility or in other words increased weakening against bending stress, acting longitudinal to these deep corrugations. The measure of the present invention may accordingly be said to find an optimal value of shallow or weak corrugations so that increased stiffness is obtained across to the corrugations without a pronounced reduction of the rigidity longitudinal to the corrugations If only one portion of the protective device, e.g. the roof plate of the same, is provided with shallow corrugations according to this invention, the interaction between these corrugations and the adjacent walls with a certain angle to the roof plate, causes a further stiffening of the device. This is in particular the case when the side walls are arranged across to the corrugations and is integrated with the roof plate in one single unit.

Figure 4:
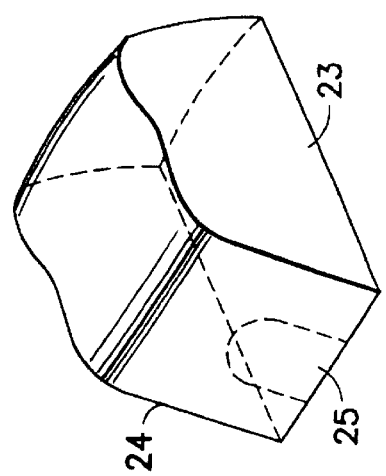
Figure 1:
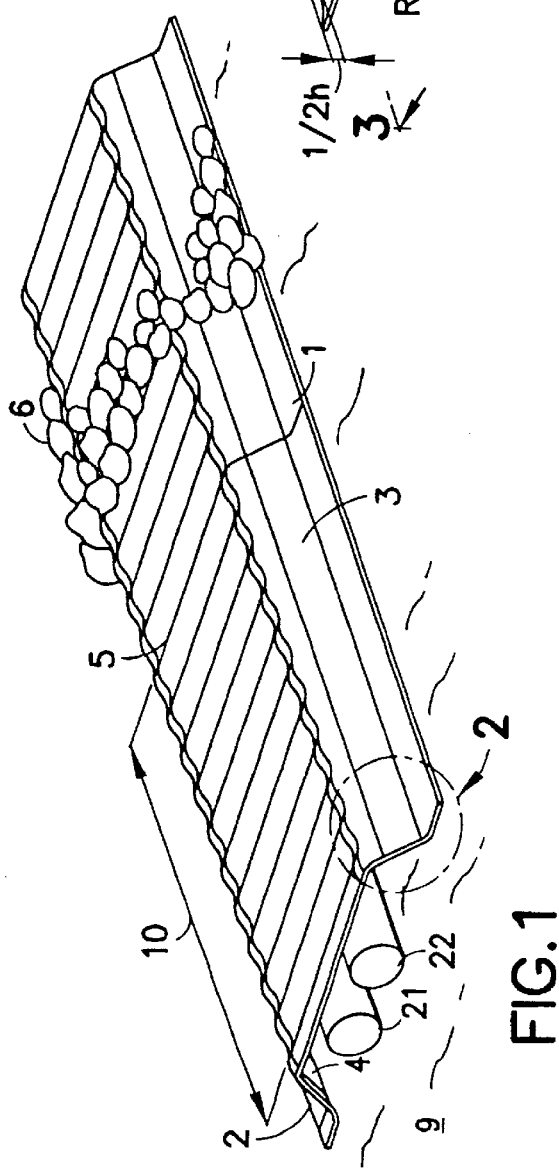
Figure 3:
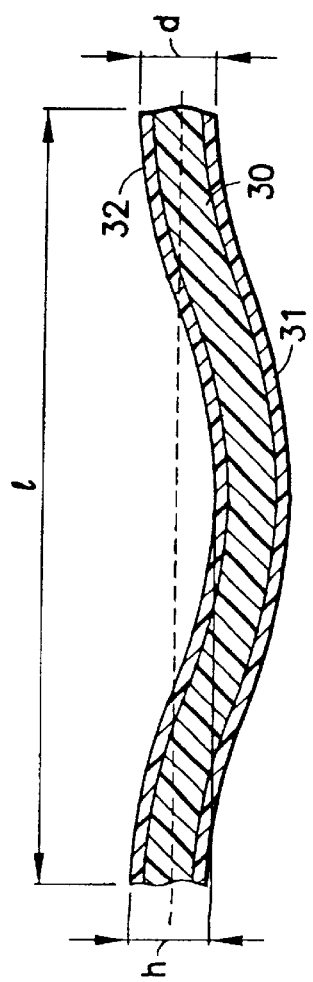

To give a clearer and more unambiguous understanding of the invention it is referred to the more detailed description below, and to the accompanying drawings in which:

FIG. 1 illustrates a protective device according to one embodiment of the present invention, FIG. 2 illustrates the protective device according to FIG. 1, however in some more detail, FIG. 3 shows an example of a preferred wave design, and FIG. 4 shows a local protective device having a main structure similar to a bucket or box, turned upside down.

It is pointed out that the same reference numbers are used, where found appropriate, when referring to corresponding details in the figures, that minor details note required to understand the invention may be omitted in the drawings to avoid crowding of the same, and that the different figures or parts of figures not necessarily are in same scale. The scale used longitudinally to and across to the material are also not necessarily identical.

In FIG. 1 the protective device according to the present invention is shown, in which the protective device consists of a longitudinal, tunnel-shaped construction, comprising two foot plates 1 and 2 preferably in the same plane, two more or less inclining side walls 3, 4 which may be plain or longitudinally corrugated related to the length of the device, and a roof plate 5 which on the figure is shown corrugated by shallow corrugations along the extension of the device. In a similar manner it is on FIG. 1 assumed that the foot plates 1, 2 are arranged on the sea bed 9, that the protective device extends above longitudinal elements which are to be protected, such as the pipelines 21, 22, and at the same time the foot plates 1, 2 and portions of the remaining protective device may be partly or completely covered by backfill material 6 to stabilize and to anchor the protective device in correct position on the sea bed 9.

It should be mentioned that the protective device may be built in sections of substantial length or may be produced in short sections, preferably sections having a length 10 at least corresponding to one complete corrugated wave periode. In addition the protective device of course may be provided with branches or may include specific joints which may be of Y-shape, L-shape, X-shape, or T-shape when seen from above.

FIG. 2 shows in more detail how the bent portions between the plate 1, the side wall 3 and the roof plate 5, respectively, are designed in a preferred embodiment. It is assumed that the corners are rounded and their curve radius may preferably be in the range 50–400 mm, which however, do not represent absolute limits. However, rather abrupt directional changes are preferred, without sharp corners, as this is deemed to give the best mechanical qualities. Again it is pointed out that the wave structure in the roof plate 5 gives a powerful stiffening of the channel in its crosswise direction, while the interaction between the roof plate 5 and the side walls 3, 4 will lead to substantial stiffening of the device in its longitudinal directions, i.e. across all the corrugations, in particular when the channel is built up from one single plate element.

In FIG. 3 there is shown a cross section through the material of the roof plate 5, taken along the plane III—III in FIG. 2. However, the plate thickness is strongly exaggerated to make the figure more clear. As assumed the protective device may be produced from a multi layer artificial material preferably comprising two outer laminated layers 31, 32 made up from a high impact, fibre reinforced material and a central layer 30 of plastics, preferably made of a high density-polyethylene which endures the pressure conditions on large ocean depths. As shown on all figures at least the roof plate 5 is provided with longitudinal, shallow corrugations, such that the wave-length 10 of one corrugation is 1, the wave-height of one corrugation is h and finally the total material thickness of the plate material is d.

To explain the idea of said invention in a simple way, it may be said that if the roof plate 5 had been designed with deep corrugations so that the cross section was more similar to the cross section of usual corrugated iron and similar products, the stiffness in the longitudinal direction would be reduced while the stiffness in the vertical plane would increase considerably. By using shallow corrugations having a low bow related to the thickness of the material and related to the wavelength of the corrugations, a considerable increase in crosswise stiffness is obtained without a reduction of the stiffness longitudinal to the tunnel, worth mentioning. Practical tests have shown that the optimal conditions are obtained when the wavelength is at least five times the bow. On the figure it is assumed that the wavelength is 10 times the waveheight, measured from the apex of the laminate. The thickness of the material is however shown exaggerated so that the layers will be clearly shown on the figure. When the production is considered, it is also considered advantageous which shallow corrugations which much easier may be combined with the integrated linking to the side walls.

Tunnel sections built in this manner will, according to practical testing, obtain a very high stiffness even if the thickness of the plate material is reduced from previously used values; the sections are stable during transportation and handling; the deployment may take place much faster and the material costs are considerably reduced. It is also assumed that the shape including longitudinal curved zones with radii r and R on FIG. 2, contributes to obtaining a rigid tunnel which is stable in its longitudinal direction.

On FIG. 4 a corresponding protective device having the shape of a box or bucket turned upside down, is shown. Here the tunnel is closed by end walls 23, 24 which also are integrated with the remaining parts of the device. This unit may have the shape of a box as shown on FIG. 4, or it may be more or less conical. If the shape is that of a truncated cone, or a bucket turned upside down, the bottom pointing upwards, may have a shallow wave form to stiffen the construction.

When the stability of the construction is considered, it may be taken into account that the dimensions of the device may be very large, for instance several tens of metres, while the thickness of the material should be as small as possible, may be a few centimetres. The material, the weight and the time used for assembling, are reduced as increased stiffness and stability allow a lower total weight giving the same degree of protection.

By alternative solutions also other parts of the device or the tunnel may be corrugated, but in most cases it will be desirable that at least the roof plates 5 are corrugated. When the cross section of the plate material is considered, this may advantageously show a laminated structure as in FIG. 3, and then preferably a so-called sandwich material as specified in the Norwegian printed patent publication No. 175.911 from the same applicant.

It is assumed advantageous, especially when used below water, that the foot plates 1,2 have a higher relative weight than the remaining parts of the protective device, or that the foot plates in one manner or another are provided with additional weight so that the tunnel will obtain a correct orientation when lowered in water.

As assumed on FIG. 1 the tunnel may be divided in short sections, preferably having a length quite down towards the wave length of the corrugations. Each section may be arranged abutting, or with some overlap, and in the latter case the end portion of each section may be designed for such overlapping.

The side walls or the end walls of the device may be provided with suitable recesses to receive pipelines, cables etc.

Even if the invention above is described as a protection device, and it substantially is to be used as such and then in particular below water, this should not be considered as a limitation for such applications only. Important qualities of the device are low weight, high strength, high stiffness, a very high resistance against corrugation, and the device also is weather and water resistant. Accordingly it should be clear for everyone that the device also may be used on land, and dependant of the design and dimensions the device may, e.g. be used for protection of structures on land, internal lining and reinforcing of all kind of tunnels, modules in building techniques, and protective covering of different objects such as transportations devices of all kinds; from high velocity trains to space stations. The device may also, when manufactured with large dimensions, be used as living quarters, for instance in offshore platforms, or as a carport. And when produced with small dimensions it may replace brics or concrete blocs, especially when a low weight load is preferable. It should also be pointed out that the angles between the different parts of the device, such as the angles between the roof plate and the respective side walls, and also between the side walls and their associated foot plates, may be varied freely, dependant of the use, and also of the relative dimensions between roof width, height of side walls and width of foot plates. Produced with a large width combined with very short side walls, the element may also be used as a floor board or floor construction with stiffening side walls having so low a height that they only acts as side edges of the floor. In a similar manner the foot plates may just as well point inwards, i.e. turn below the floor plate, as point outwards.

What is claimed is:

1. A protective device made from a plate-shaped material and shaped as a downwards open and upwards closed convex shell construction, comprising as integrated portions:

a roof plate; and at least one side wall which ends in a footplate, wherein the roof plate is undulate so as to stiffen the protective device, with cursive waves having a longer wave length than 2.5 times the wave height (h), and wherein the wave height does not exceed ten times the thickness (d) of the plate-shaped material, and where the roof plate is integrated with the at least one side wall.

2. A protective device as claimed in claim 1, wherein the wave length is less than 25 times the wave height (h).

3. A protective device as claimed in claim 1, wherein said at least one side wall of the protective device is undulate.

4. A protective device as claimed in claim 1, wherein the foot plate is undulate.

5. A protective device as claimed in claim 1, produced from a plate-shaped, multi layer, laminated material.

6. A protective device as claimed in claim 5, made of a laminated, artificial material.

7. A protective devices as claimed in claim 6, wherein the laminated artificial material comprises at least three layers, at least one layer being an artificial material having a large impact resistance.

8. A protective device as claimed in claim 1, assembled from a plurality of longitudinally combined sections.

9. A protective device as claimed in claim 8, wherein each section has a length at least corresponding to one wavelength.

10. A protective device as claimed in claim 1, wherein the foot plate is manufactured from a material having a density higher than density of the remaining parts of the protective device, and density of the complete device is higher than density of water.

11. A protective device as claimed in claim 1, further comprising undulate end walls.

12. A protective device as claimed in claim 1, wherein the wave length is more than six times the wave height and less than ten times the wave height.

* * * * *